P. A. ANDERSON.
BRAKE.
APPLICATION FILED OCT. 24, 1919.
1,427,084.
Patented Aug. 29, 1922.
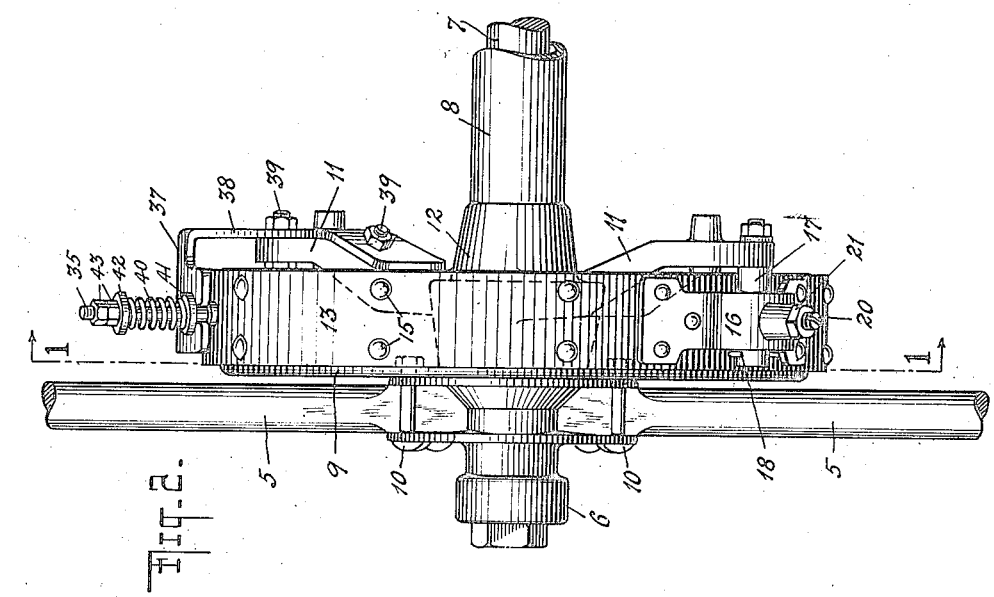
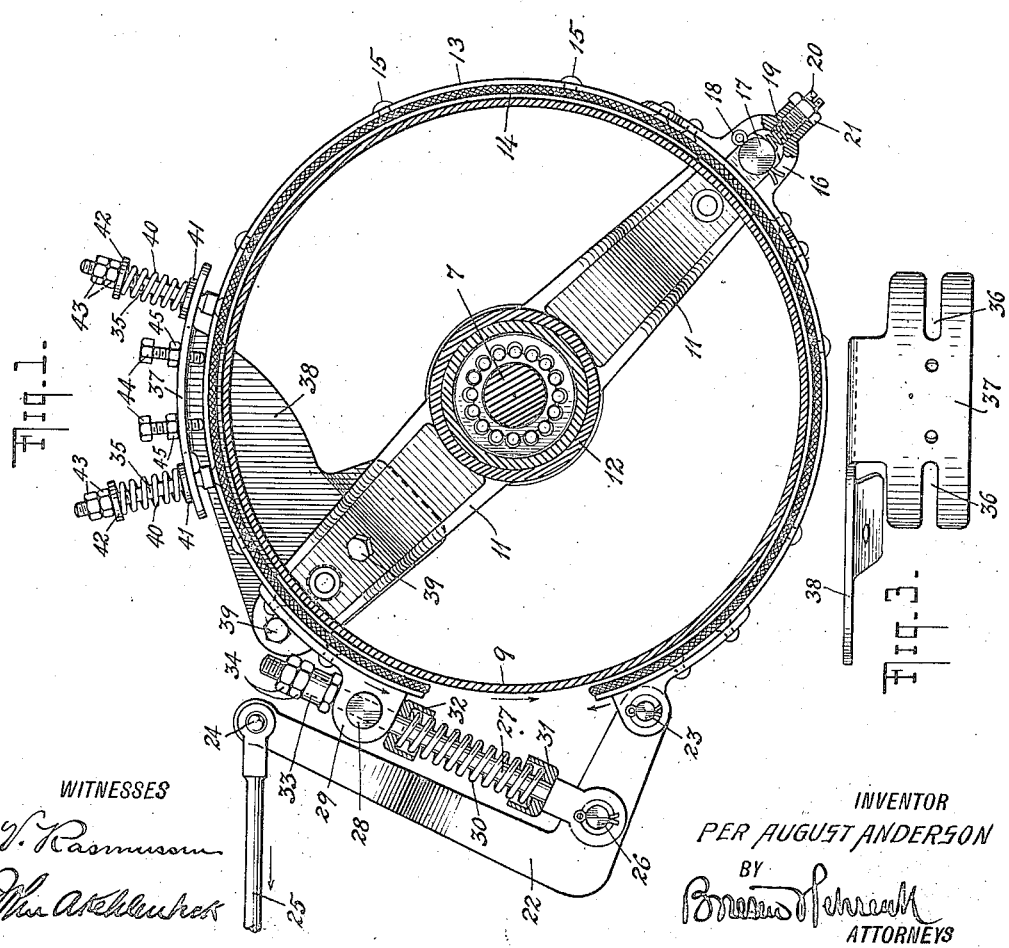
WITNESSES
INVENTOR
PER AUGUST ANDERSON
BY
ATTORNEYS

UNITED STATES PATENT OFFICE.

PER AUGUST ANDERSON, OF NEW YORK, N. Y.

BRAKE.

1,427,084.  Specification of Letters Patent.  Patented Aug. 29, 1922.

Application filed October 24, 1919. Serial No. 332,938.

*To all whom it may concern:*

Be it known that I, PER AUGUST ANDERSON, a citizen of the United States, and resident of the borough of Manhattan, city, county, and State of New York, have invented certain new and useful Improvements in Brakes, of which the following is a specification.

My invention relates to brakes and more particularly to band brakes of the type generally included in automobiles and the like, and has for its object to provide an improved construction in which a braking action of maximum efficiency with a minimum of power is secured and in which the brake band is instantaneously released from the drum at the proper time and maintained out of contact therewith until again intentionally applied. My invention will be fully described hereinafter and the features of novelty will be pointed out in the appended claims.

In the accompanying drawings which, without defining the limits of the invention, show an embodiment thereof, Fig. 1 is a sectional view of my improved brake construction on the line 1—1 of Fig. 2; Fig. 2 is an elevation thereof and Fig. 3 is a detail plan view of a bracket forming part of the invention.

In the drawings 5 represents the spokes of a wheel of well known type carried by the hub 6 which is secured upon the axle 7 in any convenient way, the axle 7 being shown as rotatably mounted in a non-rotatable tubular housing 8 as is customary in automobiles and the like. The wheel, represented by the spokes 5, carries the brakedrum 9 which is rigidly secured in position by means of suitable fastening devices such as bolts 10, said drum 9 being of any well known and recognized construction. The arrangement selected for illustration includes further a member 11 extending diametrically across the drum 9 and having a collar 12 secured upon the housing 8 whereby said member is fastened in its intended position, it being understood that this member constitutes a support as will hereinafter be fully pointed out, and that its equivalent for the purposes of the present invention may be of different form and arrangement in other makes of automobiles. The elements so far described may be of any existing type or they may be specially constructed to meet special conditions.

My improved brake construction comprises a brake band 13 preferably constructed of metal having a certain amount of flexibility and extending circumferentially about the brake drum 9, as shown in Fig. 1. A suitable brake lining 14 is fastened upon the interior surface of the band 13 in any well known way, as by means of rivets 15. The brake band 13 carries a yoke 16 which slidably fits over a stud 17 projecting outwardly from the member 11 or its equivalent; a cotter pin 18 extends through said stud 17 to maintain said yoke 16 against unintentional removal therefrom. The yoke 16 carries a spring 19, one end of which bears against the stud 17 and the other end of which is located in a socket in contact with an adjusting screw 20 also carried by said yoke; a lock nut 21 may be provided for securing the screw 20 in an adjusted position. A bell crank lever 22 is pivotally connected at 23 with one end of the band 13 and at 24 with the brake rod 25 which is connected with the foot pedal, brake lever or other actuating means whereby said brake is applied. The bell crank lever 22 is further pivotally connected at 26 with a stem 27 which extends slidably through a block 28 pivotally mounted in lugs 29 fastened in any suitable manner as by rivets to the other end of the brake band 13. A coil spring 30 surrounds the stem 27 and has its one end in engagement with a cup 31 which may be fixed upon said stem and its other end in contact with a cup 32 which is slidably mounted thereon. The projecting end of said stem is screw-threaded for the accommodation of an adjusting nut 33, which by bearing against the lugs 29 serves to adjust the brake band 13 and the tension of the spring 30, lock nuts 34 being provided for maintaining the nut 33 in its adjusted position.

In addition to the parts so far described my improved construction includes one or more and preferably a pair of rods 35 which are secured to the brake band 13 in spaced relation to each other and project outwardly therefrom as shown in Fig. 2. The rods 35 extend through slots 36 formed in a member 37 located at a distance from the band 13 and extending parallel therewith, said member 37 preferably comprising an integral part of a bracket 38. The latter constitutes the means whereby said member 37 is secured and maintained in its intended position and is fastened to a suitable non-rotating part of the vehicle; for instance, as shown, said bracket 38 may be attached to the support constituted by the member 11 by means of bolts 39, as shown in Figs. 1 and 2, or to an equivalent supporting medium. In the preferred construction the slots 36 are open ended as shown in Fig. 3, this being mainly for convenience in manufacture. Coil springs 40 surround the rods 35 and bear with their opposite ends against washers 41 and 42 respectively, the former being located upon the member 37 and the latter engaging nuts 43 upon the screw-threaded ends of said rods 35 as shown in Fig. 2. One or more, and preferably two stop screws, 44, project through the member 37 in screw-threaded engagement therewith into proximity to the brake band 13 and are secured in their adjusted positions by means of lock nuts 45 or other equivalent devices.

In operation, as a pull in the direction of the arrow in Fig. 1 is exerted upon the brake rod 25 the bell crank lever 22 will be actuated and in co-operation with the stem 27 will contract the brake band 13 and its lining 14 in circumference and bring it into contact with the peripheral surface of the brake drum 9. As this contraction of the brake band 13 occurs, the springs 19, and 40 are all compressed, the rods 35 because of their freedom of movement in the slots 36 adjusting themselves relatively to the member 37 in accordance with the new position of the brake band. As soon as the pull upon the brake rod 25 ceases, or in other words the brake actuating means is released, the brake band 13 and its lining 14 are instantaneously returned to normal position out of contact with the brake drum 9, this being due to the action of the springs 19, and 40. The brake band 13 being yieldingly supported and being free to move throughout its entirety and because of its inherent flexibility is wrapped about the drum 9 when a force is exerted upon the rod 25 to apply the brake. In other words, substantially all parts of the peripheral surface of the brake drum 9 are engaged by substantially all parts of the brake lining 14 in contradistinction to being merely squeezed thereby at one or more individual points as is the case in existing construction. The action of the brake is thus extremely positive and the power necessary to appply it to secure effective results is reduced to a minimum. At the same time, by reason of the action of the springs 19, and 40, the brake is quickly moved away from the drum concurrently at all points so that a quick and full release of the brake is assured and binding or sticking thereof to the drum is obviated.

The arrangement is economical to produce and is readily installed in operative position without requiring any changes in existing constructions of self-propelled vehicles. Because of the fact that the brake band is itself positively supported, particularly by the springs 40, rattling and objectionable vibration is eliminated. The construction may be of minimum weight without interfering with its efficiency and may readily be substituted in vehicles equipped with existing types of band brakes.

Various changes in the specific form shown and described may be made within the scope of the claims without departing from the spirit of my invention.

I claim:

1. A bracket for supporting a brake-band in operative position, comprising a substantially flat bracket member provided with a plurality of apertures extending therethrough for the accommodation of bolts whereby said bracket is fastened in place, and a brake-band member extending transversely from said bracket-member and having an integral connection with a fractional part of one edge of the latter, said brake-band member having a curved form corresponding approximately to the curve of the brake-band which it is intended to support and being slotted to receive resilient devices whereby the brake-band is mounted upon said brake-band member, the latter being further provided with an aperture for the accommodation of a stop-screw whereby the resilient action of the resilient devices is arrested.

2. The combination of a brake drum, a brake band extending circumferentially thereof, a bell crank lever pivotally connected to one end of said band, a stem pivotally connected with said lever and slidably connected with the other end of said brake band, means for actuating said lever to apply the brake to the drum, a support, a bracket detachably connected with said support, a slotted member forming part of said bracket, a pair of rods projecting outwardly from said band and through the slots of said member, coil springs surrounding said rods, a stud on said support, a yoke carried by said band and embracing said stud, a spring between said stud and said yoke, said springs being compressed when the brake is applied and restoring the band to normal position when the actuating means is released and an adjustable stop carried by said bracket member for arresting the restoring movement of said band.

In testimony whereof I have hereunto set my hand.

PER AUGUST ANDERSON.